G. A. ENSIGN.
TENSION DEVICE FOR BAND SAWS.
APPLICATION FILED APR. 6, 1912.
1,038,328.
Patented Sept. 10, 1912.
2 SHEETS—SHEET 2.
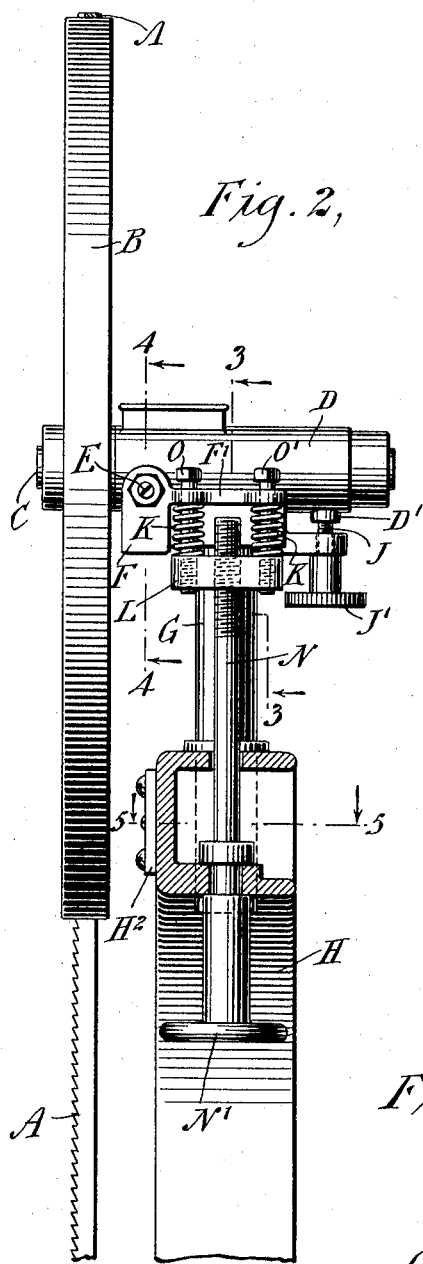
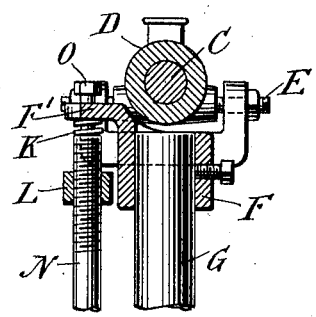
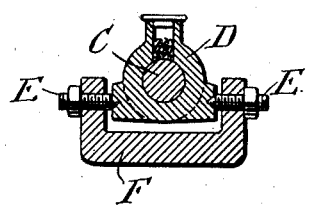
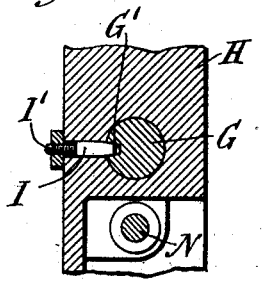
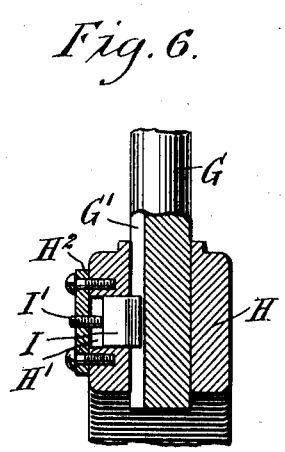
WITNESSES
Edward Thorpe
INVENTOR
George A. Ensign
BY
ATTORNEYS

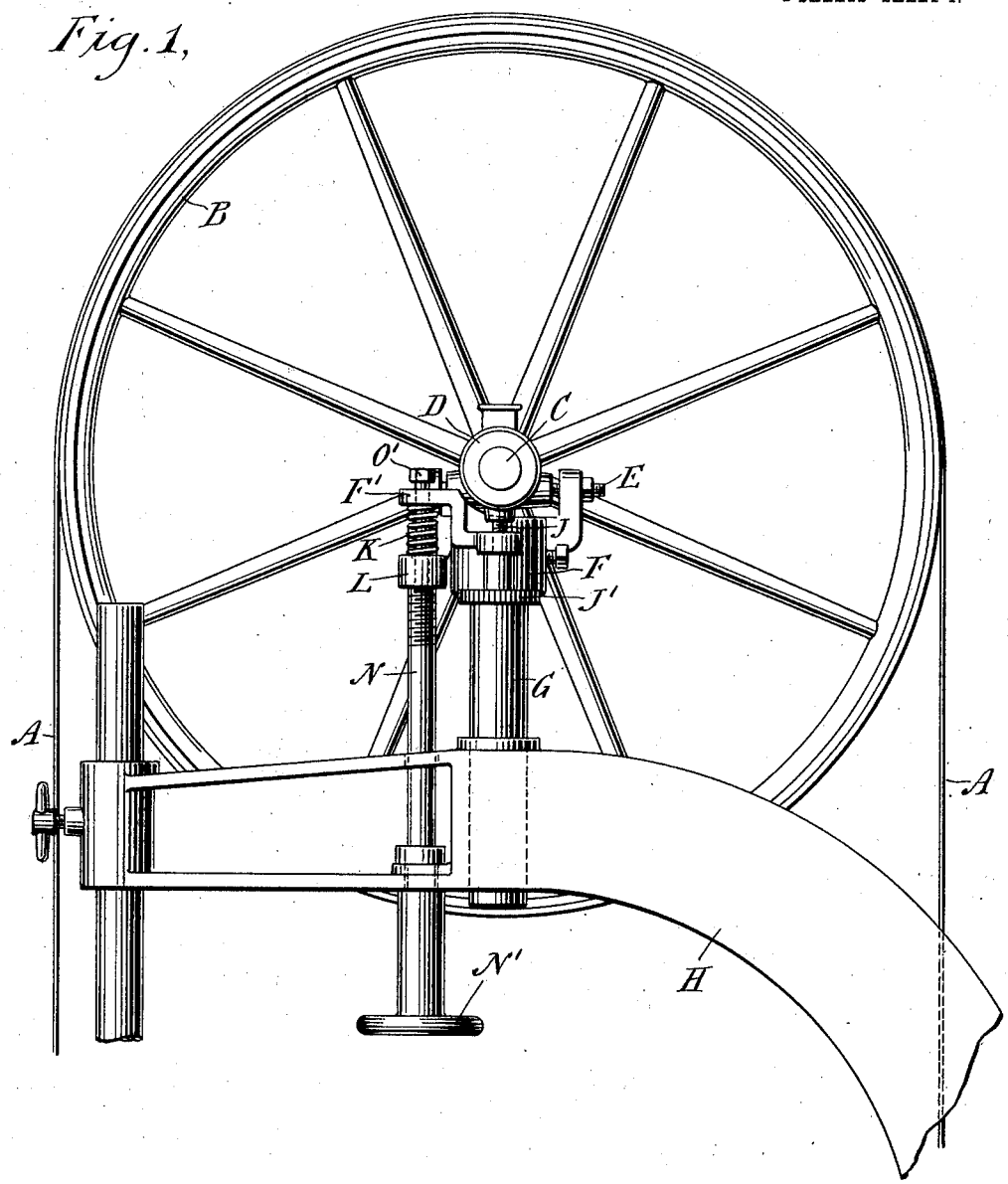

UNITED STATES PATENT OFFICE.

GEORGE A. ENSIGN, OF DEFIANCE, OHIO, ASSIGNOR TO DEFIANCE MACHINE WORKS, OF DEFIANCE, OHIO.

TENSION DEVICE FOR BAND-SAWS.

1,038,328.  Specification of Letters Patent.  Patented Sept. 10, 1912.

Application filed April 6, 1912. Serial No. 688,882.

*To all whom it may concern:*

Be it known that I, GEORGE A. ENSIGN, a citizen of the United States, and a resident of Defiance, in the county of Defiance and State of Ohio, have invented a new and Improved Tension Device for Band-Saws, of which the following is a full, clear, and exact description.

The invention relates to woodworking machines, and its object is to provide a new and improved tension device for band-saws arranged to maintain a uniform tension on the saw blade to permit light or heavy sawing of hard or soft wood without danger of breaking the saw blade or running the same off the wheels. For the purpose mentioned use is made of a post mounted to slide up and down on the saw frame and carrying a bearing for the spindle of the upper wheel, and a vertically adjustable spring support for the said post to automatically tighten the saw blade on the wheels.

A practical embodiment of the invention is represented in the accompanying drawings forming a part of this specification in which similar characters of reference indicate corresponding parts in all the views.

Figure 1 is a side elevation of the tension device as applied to the upper wheel of a band-saw; Fig. 2 is a front elevation of the same, the supporting arm of the frame being shown in section; Fig. 3 is a sectional side elevation of the same on the line 3—3 of Fig. 2; Fig. 4 is a similar view of the same on the line 4—4 of Fig. 2; Fig. 5 is a sectional plan view of the same on the line 5—5 of Fig. 2; and Fig. 6 is a sectional front elevation of the lower end of the post and its bearing in the frame arm.

The endless saw blade A passes around the usual upper and lower wheels of the band-saw, the upper wheel B being shown in the drawings, and the said upper wheel being secured on the spindle C journaled in a bearing D hung at its front end on centers E carried by a head F attached to the upper end of a post G mounted to slide up and down in a suitable bearing arranged on the overhanging arm H forming part of the main frame on which the band-saw is mounted. The post G is provided with a groove G′ extending lengthwise of the post and having tapering side walls engaged by the tapering end of a key I held in a recess H′ formed in the arm H, as plainly illustrated in Figs. 5 and 6. The key I is adapted to be adjusted in an inward direction to compensate for wear between the key and the walls of the groove G′, and in order to adjust the said key use is made of a set screw I′ screwing in a cover $H^2$ closing the opening H′. By the arrangement described the post G is free to slide up and down but is held against turning by the key I engaging the groove G′. The rear end of the bearing D is provided with a threaded boss D′ in which screws a screw J mounted to turn on the head F and having a head J′ under the control of the operator for turning the screw J so as to swing the bearing D on the centers E with a view to bring the upper wheel B in perfect alinement with the lower wheel to insure a proper running of the saw blade A without danger of the saw blade leaving either the upper or lower wheel. The head F is provided at one side with a bracket F′ against which abut the upper ends of coil springs K resting on a cross bar L in which screws the upper end of a screw rod N mounted to turn on the arm H, the lower end of the screw rod N being provided with a hand wheel N′ under the control of the operator for turning the screw rod N with a view to move the cross bar L up or down according to the direction in which the screw rod N is turned at the time. Guide pins O and O′ are screwed or otherwise secured to the cross bar L and pass through the openings in the coil springs K and slidingly engage the bracket F′ so as to hold the cross bar L against turning, at the same time holding the coil springs K in position. By the arrangement described the bearing D is spring-supported and consequently is free to yield to give the desired tension to the saw blade A with a view to allow the saw blade to saw light or heavy in hard or soft wood without danger of breaking the saw blade.

It is expressly understood that the downward pull of the saw blade A on the wheel B is sustained by the coil springs K and the tension of the same may be adjusted by the operator turning the screw rod N correspondingly so that the wheel B is free to yield to hold the saw blade A under the proper tension and to allow automatic tightening or loosening of the saw blade.

Having thus described my invention, I claim as new and desire to secure by Letters Patent:

In a band saw, the combination of a fixed part, a post mounted to slide up and down on the said fixed part and provided with a head, a bearing for the wheel spindle and provided at one side with a bracket, centers carried on the said head and on which is hung one end of the said bearing, a limiting screw on the said head and engaging the said bearing for limiting the swinging motion of the said bearing, a screw rod mounted to turn in the said fixed part and intermediate the said centers and the said limiting screw, a cross bar in which screws the said screw rod, coil springs interposed between the said cross bar and the said bracket, and guide rods held on the said cross bar and slidingly engaging the said bracket, the said guide bars passing through the openings in the said coil springs.

In testimony whereof I have signed my name to this specification in the presence of two subscribing witnesses.

GEORGE A. ENSIGN.

Witnesses:
C. H. KETTENING,
F. E. HALL.

Copies of this patent may be obtained for five cents each, by addressing the "Commissioner of Patents, Washington, D. C."